US011708789B2

(12) United States Patent
Payne et al.

(10) Patent No.: US 11,708,789 B2
(45) Date of Patent: Jul. 25, 2023

(54) GENERATOR MODULE

(71) Applicant: Schaeffler Technologies AG & Co. KG, Herzogenaurach (DE)

(72) Inventors: Matthew Payne, Glenmont, OH (US); Markus Steinberger, Sagamore Hills, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/560,313

(22) Filed: Dec. 23, 2021

(65) Prior Publication Data

US 2023/0114756 A1  Apr. 13, 2023

Related U.S. Application Data

(60) Provisional application No. 63/253,817, filed on Oct. 8, 2021.

(51) Int. Cl.
*H02J 3/01* (2006.01)
*F02B 63/04* (2006.01)
*H02K 7/18* (2006.01)
*F02B 63/06* (2006.01)

(52) U.S. Cl.
CPC .......... *F02B 63/042* (2013.01); *F02B 63/044* (2013.01); *F02B 63/06* (2013.01); *H02K 7/1815* (2013.01); *F02B 2063/045* (2013.01)

(58) Field of Classification Search
CPC .................................................... H02K 7/1815
See application file for complete search history.

(56) References Cited

U.S. PATENT DOCUMENTS

| | | | |
|---|---|---|---|
| 6,624,543 B1* | 9/2003 | Bankstahl | F02B 63/04 310/91 |
| 2007/0096572 A1* | 5/2007 | Watkins | H02K 5/1732 310/90 |
| 2009/0085418 A1* | 4/2009 | Kobayashi | H02K 3/522 310/66 |
| 2010/0018824 A1* | 1/2010 | McCrary | F16D 3/06 192/55.3 |
| 2010/0105518 A1* | 4/2010 | Kasuya | B60K 6/485 477/5 |
| 2013/0154273 A1 | 6/2013 | Kurihara | |
| 2016/0084363 A1* | 3/2016 | Steinberger | F16H 45/00 192/3.28 |
| 2017/0335937 A1* | 11/2017 | Depraete | F16F 15/145 |
| 2018/0062469 A1* | 3/2018 | Satyaseelan | H02K 1/28 |
| 2019/0165636 A1* | 5/2019 | Rittmeyer | H02K 15/0006 |
| 2019/0344562 A1* | 11/2019 | Korthuis | B41J 2/04543 |
| 2020/0040976 A1* | 2/2020 | Steiner | F16D 13/385 |
| 2021/0221215 A1 | 6/2021 | Iguma et al. | |

* cited by examiner

*Primary Examiner* — Sean Gugger

(57) ABSTRACT

A generator module includes a housing arranged for mounting to a rear face of an internal combustion engine, a generator stator fixed in the housing, a generator rotor arranged radially inside of the generator stator, and a bearing arranged to support a radial inside of the generator rotor on the housing. The generator rotor may include a rotor carrier and a plurality of stacked plates secured to the rotor carrier. The bearing may be at least partially radially aligned with the plurality of stacked plates.

16 Claims, 1 Drawing Sheet

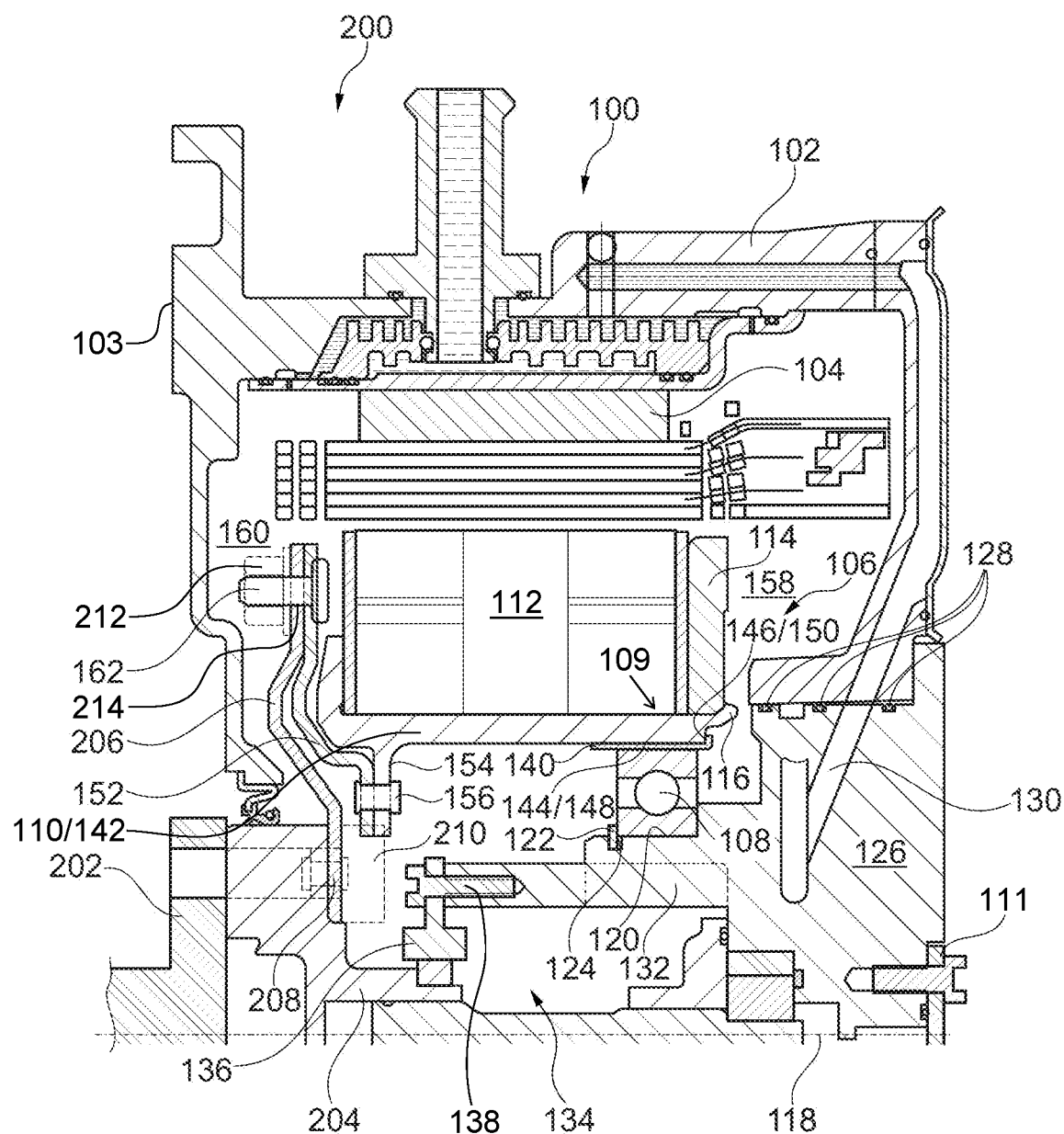

GENERATOR MODULE

CROSS-REFERENCE TO RELATED APPLICATIONS

This application claims the benefit of U.S. Provisional Patent Application No. 63/253,817, filed Oct. 8, 2021, the disclosure of which is incorporated in its entirety by reference herein.

TECHNICAL FIELD

The present disclosure relates generally to a generator module, and more specifically to an E-motor directly connected to an internal combustion engine via a flex plate connection and supported by a bearing.

BACKGROUND

A vehicle having a powertrain system with a generator shaft disconnected from a drive shaft is known from United States Patent Application Publication No. 2021/0221215 titled POWERTRAIN SYSTEM to IGUMA et al. In this publication, the disclosed generator includes a rotating shaft connected to a crankshaft of an internal combustion engine via a torsional damper.

SUMMARY

Example aspects broadly comprise a generator module including a housing arranged for mounting to a rear face of an internal combustion engine, a generator stator fixed in the housing, a generator rotor arranged radially inside of the generator stator, and a bearing arranged to support a radial inside of the generator rotor on the housing. In an example embodiment, the generator rotor includes a rotor carrier and a plurality of stacked plates secured to the rotor carrier. The bearing is at least partially radially aligned with the plurality of stacked plates.

In some example embodiments, the housing includes a first cylindrical surface and the bearing is pressed onto the first cylindrical surface. In an example embodiment, the generator module also includes a snap ring. The housing includes a groove and the snap ring is disposed in the groove to axially secure the bearing. In some example embodiments, the housing includes a pump housing, sealed to the housing, and the pump housing includes the first cylindrical surface. In some example embodiments, the pump housing includes a cylindrical protrusion and the first cylindrical surface is disposed on the cylindrical protrusion. In an example embodiment, the generator module includes a rotary position sensor with an encoder fixed to a distal end of the cylindrical protrusion.

In some example embodiments, the generator module includes a hardened shim ring disposed radially between the bearing and the generator rotor. In an example embodiment, the generator rotor includes a rotor carrier hub with a second cylindrical surface and a first radial wall. The hardened shim ring has a third cylindrical surface contacting the second cylindrical surface and a second radial wall contacting the first radial wall.

In some example embodiments, the generator module includes a drive plate. The generator rotor includes a rotor carrier hub with a protrusion extending radially inward, and the drive plate is fixed to the protrusion. In an example embodiment, the bearing is disposed at a first axial end of the rotor carrier hub and the protrusion is disposed at a second axial end of the rotor carrier hub, opposite the first axial end. In some example embodiments, the drive plate includes a stud arranged for fixing to a flexplate. In an example embodiment, the generator rotor includes a plurality of stacked plates secured to the rotor carrier hub and the stud is axially aligned with the plurality of stacked plates. 14. In some example embodiments, the generator module includes the flexplate and a nut, and the nut is threaded onto the stud to secure the flexplate to the drive plate. In some example embodiments, the generator module includes a hub fixed to the flexplate and arranged for fixing to a crankshaft of the internal combustion engine. In an example embodiment, the hub is fixed to the flexplate by a rivet.

Other example aspects broadly comprise an engine assembly including the generator module, a crankshaft, a hub fixed to the crankshaft, and a flexplate fixed to the hub and the drive plate. In an example embodiment, prior to fixing to the crankshaft, the hub is fixed to the flexplate by a rivet. In an example embodiment, the engine assembly includes a crank bolt. The hub is fixed to the crankshaft by the crank bolt and the flexplate is fixed to the hub by the crank bolt. In an example embodiment, the engine assembly includes a nut. The flexplate includes an aperture and the drive plate includes a stud extending through the aperture and secured to the flexplate by the nut.

BRIEF DESCRIPTION OF THE DRAWINGS

The single FIGURE illustrates a top half cross sectional view of a generator module according to an example aspect of the present disclosure.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The FIGURES are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the FIGURES can be combined with features illustrated in one or more other FIGURES to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

The single FIGURE illustrates a top half cross sectional view of generator module 100 according to an example aspect of the present disclosure. Although the device is referred to as a generator module, it may also be referred to as an e-motor as these devices can generally be operated as a motor or a generator, and often operate as both. For example, the device may be used as a motor to start the combustion engine and a generator to generate electricity to charge a battery or power a home or vehicle once the combustion engine is running.

Generator module 100 includes housing 102 arranged for mounting to a rear face of an internal combustion engine (not shown) at face 103, generator stator 104 fixed in the housing, generator rotor 106 arranged radially inside of the generator stator, and bearing 108 arranged to support a radial inside of distal end 109, axially opposite face 103, of the generator rotor on the housing. Housing 102 may be integrally formed from a single material, or be pieced together from several pieces as shown in the FIGURE. Note that the several components of housing 102 in the FIGURE have been sealed together by various seals, many of which are o-ring seals. It should also be noted that, housing 102 includes seal plate 111 that seals an axial end of the housing. In other words, there are no shafts extending from housing 102 for connection with a transmission, for example, as is common with known hybrid modules.

Generator rotor 106 includes rotor carrier 110 and stacked plates 112 secured to the rotor carrier with end plate 114 and formed portion 116 of the rotor carrier, for example. Portion 116 may be formed by coining or staking, for example. As can be seen in the FIGURE, bearing 108 is partially radially aligned with the stacked plates. By radially aligned, we mean that a radial line drawn perpendicular to axis 118 intersects both the bearing and the stacked plates. Housing 102 includes cylindrical surface 120 and bearing 108 is pressed onto surface 120. By pressed onto, we mean that the bearing must be forced onto the surface with some force greater than nominal force. In other words, the bearing is not hand assembled and must be forced onto the surface using mechanical force. This creates a tight fit between the bearing and the surface, preventing the bearing from rotating relative to the surface when subjected to drag from a cold temperature grease, for example.

Generator module 100 also includes snap ring 122 and housing 102 includes groove 124. Snap ring 122 is disposed in the groove to axially secure the bearing. In other words, once the bearing is pressed onto the cylindrical surface, the snap ring is installed in the groove to prevent the bearing from being axially dislodged from the surface. Housing 102 includes pump housing 126, sealed to another portion of the housing via seals 128, for example. The pump housing is arranged to receive components for an engine driven hydraulic pump that distributes cooling and/or lubricating fluid to the generator module 100 through channel 130, for example. Pump housing 126 includes cylindrical surface 120. Pump housing 126 includes cylindrical protrusion 132 and cylindrical surface 120 is disposed on the cylindrical protrusion. Generator module 100 also includes rotary position sensor 134 with encoder 136 fixed to a distal end of the cylindrical protrusion by bolt 138, for example.

Generator module 100 includes hardened shim ring 140 disposed radially between the bearing and the generator rotor. Generator rotor 106 includes rotor carrier hub 142 with cylindrical surface 144 and radial wall 146, and the hardened shim ring includes cylindrical surface 148 contacting cylindrical surface 144 and radial wall 150 contacting radial wall 146.

Generator module 100 includes drive plate 152. Rotor carrier hub 142 includes protrusion 154 extending radially inward and the drive plate is fixed to the protrusion by rivet 156, for example. Bearing 108 is disposed at axial end 158 of the rotor carrier hub, and the protrusion is disposed at axial end 160 of the rotor carrier hub, opposite axial end 158. Drive plate 152 includes stud 162 arranged for fixing to a flexplate, as described in more detail below. Stud 162 is axially aligned with stacked plates 112. By axially aligned, we mean that a line drawn parallel to axis 118 intersects both the stud and the stacked plates.

Engine assembly 200 includes generator module 100, crankshaft 202, hub 204 fixed to the crankshaft, and flexplate 206 fixed to the hub and the drive plate. Prior to fixing to the crankshaft, the hub is fixed to the flexplate by rivet 208. That is, in order to speed assembly of the hub and flexplate to the crankshaft, the flexplate is preassembled to the hub by a rivet as a subassembly so that both parts can be fixed to the crankshaft without the need for extra alignment of the components. Engine assembly 200 includes crank bolt 210. The hub is fixed to the crankshaft by the crank bolt and the flexplate is fixed to the hub by the crank bolt. In other words, the crank bolt extends through all three components, fixing them together.

Engine assembly 200 includes nut 212, flexplate 206 includes aperture 214, and drive plate 152 includes stud 162 extending through the aperture and secured to the flexplate by the nut. In other words, during assembly of the engine assembly, the drive plate mates to the flexplate and the stud is threaded onto the stud to secure the components together. The flexplate provides extra flexibility for connecting the drive plate to the crankshaft to prevent overconstraining the engine assembly and allows the crankshaft to "wobble" without unnecessary binding at bearing 108. Furthermore, hardened shim 140 between the rotor carrier and bearing permits axial sliding of the rotor carrier relative to the bearing during crankshaft "wobble" without damaging the rotor carrier. Together, the flexplate and hardened shim work together to provide necessary flexibility between the crankshaft and the bearing.

Generator module 100 or engine assembly 200 may be used in a series hybrid vehicle, for example. These types of vehicles have no mechanical connection between an engine and a drive wheel. Instead, the engine powers a generator which generates electrical power that powers an electric motor to propel the vehicle. While a vehicle is proposed, the generator module or engine assembly may also be used in other applications where an engine powered generator is required. One possibility is a stand-alone generator application whereby the generator generates electrical power for use in a home, building, or power grid, for example.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Generator module
102 Housing
103 Face
104 Generator stator
106 Generator rotor
108 Bearing
109 Distal end
110 Rotor carrier
111 Seal plate
112 Stacked plates
114 End plate
116 Formed portion
118 Axis
120 Cylindrical surface (first)
122 Snap ring
124 Groove
126 Pump housing
128 Seals
130 Channel
132 Cylindrical protrusion
134 Rotary position sensor
136 Encoder
138 Bolt
140 Hardened shim ring
142 Rotor carrier hub
144 Cylindrical surface (second)
146 Radial wall (first)
148 Cylindrical surface (third)
150 Radial wall (second)
152 Drive plate
154 Protrusion
156 Rivet
158 Axial end (first)
160 Axial end (second)
162 Stud
200 Engine assembly
202 Crankshaft
204 Hub
206 Flexplate
208 Rivet
210 Crank bolt
212 Nut

What is claimed is:

1. A generator module, comprising:
a housing comprising:
   a face arranged for mounting to a rear face of an internal combustion engine; and
   a pump housing comprising a cylindrical protrusion;
a generator stator fixed in the housing;
a generator rotor arranged radially inside of the generator stator;
a bearing:
   pressed onto the cylindrical protrusion; and
   arranged to support a radial inside of a distal end, opposite the face, of the generator rotor on the housing; and
a rotary position sensor comprising an encoder fixed to a distal end of the cylindrical protrusion.

2. The generator module of claim 1 wherein:
the generator rotor comprises:
   a rotor carrier; and
   a plurality of stacked plates secured to the rotor carrier; and
the bearing is at least partially radially aligned with the plurality of stacked plates.

3. The generator module of claim 1 further comprising a snap ring wherein:
the pump housing comprises a groove; and
the snap ring is disposed in the groove to axially secure the bearing.

4. The generator module of claim 1 further comprising a hardened shim ring disposed radially between the bearing and the generator rotor.

5. The generator module of claim 4 wherein:
the generator rotor comprises a rotor carrier hub comprising:
   a second cylindrical surface; and
   a first radial wall; and
the hardened shim ring comprises:
   a third cylindrical surface contacting the second cylindrical surface; and
   a second radial wall contacting the first radial wall.

6. The generator module of claim 1 further comprising a drive plate wherein:
the generator rotor comprises a rotor carrier hub comprising a protrusion extending radially inward; and
the drive plate is fixed to the protrusion.

7. The generator module of claim 6 wherein:
the bearing is disposed at a first axial end of the rotor carrier hub; and
the protrusion is disposed at a second axial end of the rotor carrier hub, opposite the first axial end.

8. The generator module of claim 6 wherein the drive plate comprises a stud arranged for fixing to a flexplate.

9. The generator module of claim 8 wherein:
the generator rotor comprises a plurality of stacked plates secured to the rotor carrier hub; and
the stud is axially aligned with the plurality of stacked plates.

10. The generator module of claim 8 further comprising:
the flexplate; and
a nut, wherein the nut is threaded onto the stud to secure the flexplate to the drive plate.

11. The generator module of claim 10 further comprising a hub fixed to the flexplate and arranged for fixing to a crankshaft of the internal combustion engine.

12. The generator module of claim 11 wherein the hub is fixed to the flexplate by a rivet.

13. An engine assembly, comprising:
the generator module of claim 6;
a crankshaft;
a hub fixed to the crankshaft; and
a flexplate fixed to the hub and the drive plate.

14. The engine assembly of claim 13 wherein, prior to fixing to the crankshaft, the hub is fixed to the flexplate by a rivet.

15. The engine assembly of claim 13 further comprising a crank bolt wherein:
the hub is fixed to the crankshaft by the crank bolt; and
the flexplate is fixed to the hub by the crank bolt.

16. The engine assembly of claim 13 further comprising a nut wherein:
   the flexplate comprises an aperture; and
   the drive plate comprises a stud extending through the aperture and secured to the flexplate by the nut.

* * * * *